(12) United States Patent
Shin et al.

(10) Patent No.: US 9,008,656 B2
(45) Date of Patent: Apr. 14, 2015

(54) METHOD AND APPARATUS OF SEARCHING FOR OPERATOR NETWORK IN A MULTI-RADIO ACCESS TECHNOLOGY ENVIRONMENT

(71) Applicant: Samsung Electronics Co. Ltd., Suwon-si, Gyeonggi-do (KR)

(72) Inventors: Chung-Ho Shin, Yongin-si (KR); Chan-Young Kim, Bucheon-si (KR); Byoung-Jae Bae, Suwon-si (KR); Jae-Ho Song, Suwon-si (KR); Woon-Haing Hur, Seoul (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 84 days.

(21) Appl. No.: 13/951,890

(22) Filed: Jul. 26, 2013

(65) Prior Publication Data

US 2014/0235237 A1    Aug. 21, 2014

(30) Foreign Application Priority Data

Feb. 15, 2013 (KR) ........................ 10-2013-0016227

(51) Int. Cl.
*H04W 4/00* (2009.01)
*H04W 48/16* (2009.01)

(52) U.S. Cl.
CPC .................................... *H04W 48/16* (2013.01)

(58) Field of Classification Search
USPC ......................... 455/422.1, 432.1, 434, 435.2
See application file for complete search history.

(56) References Cited

U.S. PATENT DOCUMENTS

| | | | |
|---|---|---|---|
| 2007/0270147 A1 | 11/2007 | Choi et al. | |
| 2010/0113023 A1* | 5/2010 | Huang et al. | 455/436 |
| 2012/0190361 A1* | 7/2012 | Shaikh et al. | 455/434 |
| 2013/0237257 A1* | 9/2013 | Walke et al. | 455/458 |
| 2014/0213277 A1* | 7/2014 | Jang | 455/453 |

FOREIGN PATENT DOCUMENTS

KR        10-0754793 B1    9/2007

* cited by examiner

*Primary Examiner* — Ajit Patel
(74) *Attorney, Agent, or Firm* — Jefferson IP Law, LLP (57) ABSTRACT

A method and apparatus of searching for an operator network in a multi-Radio Access Technology (RAT) environment are provided. The method, calculating a length of a sleep interval to perform background Public Land Mobile Network (PLMN) searching, comparing the length of the sleep interval with a predetermined reference parameter, if the length of the sleep interval is larger than the reference parameter, performing background PLMN searching of a passive RAT during the sleep interval, and if the length of the sleep interval is equal to or smaller than the reference parameter, performing background PLMN searching of an active RAT during the sleep interval.

13 Claims, 8 Drawing Sheets

METHOD AND APPARATUS OF SEARCHING FOR OPERATOR NETWORK IN A MULTI-RADIO ACCESS TECHNOLOGY ENVIRONMENT

PRIORITY

This application claims the benefit under 35 U.S.C. §119 (a) of a Korean patent application filed on Feb. 15, 2013 in the Korean Intellectual Property Office and assigned Serial No. 10-2013-0016227, the entire disclosure of which is hereby incorporated by reference.

BACKGROUND OF THE INVENTION

1. Field of the Invention

The present invention relates to network search in a wireless communication system. More particularly, the present invention relates to a method and apparatus of searching for an operator network and selecting the operator network by background searching and network selection in an environment to which multiple Radio Access Technologies (RATs) are applied.

2. Description of the Related Art

A Public Land Mobile Network (PLMN) is a mobile communication network configured generally with Base Stations (BSs) each managing one or more cells, a subscriber server, and a gateway. Mobile communication operators that provide mobile communication services have unique PLMN Identifiers (IDs) and a wireless terminal identifies the mobile communication operator and RAT of a mobile communication network to which a BS belongs by a PLMN ID received from the BS. Different mobile communication operators provide mobile communication services in different frequency bands. For example, RATs include 3rd Generation (3G) technologies such as Global System for Mobile communications (GSM), Code Division Multiple Access (CDMA), Wideband CDMA (WCDMA), Universal Mobile Telecommunications System (UMTS) and 4G technologies such as Long-Term Evolution (LTE), and the like.

To receive a mobile communication service, a wireless terminal is registered to a Home PLMN (HPLMN) of a specific mobile communication operator. If the wireless terminal supports roaming, the wireless terminal may receive a telephony service or a data communication service from a PLMN of another mobile communication operator other than the home PLMN. The network belonging to a different service provider (e.g., the other mobile communication operator) and visited by the wireless terminal visits is called a Visited PLMN (VPLMN).

In the European Telecommunication Standards Institute (ETSI) or 3rd Generation Partnership Project (3GPP), it is regulated that when a wireless terminal is located in a VPLMN, the wireless terminal searches for an HPLMN during a predetermined scanning time. In other words, when the wireless terminal receives a service in the VPLMN, a scanning timer of the wireless terminal (e.g., set to 2 minutes) starts and upon expiration of the scanning timer, the wireless terminal searches adjacent PLMNs for the HPLMN. In addition, the wireless terminal may search PLMNs in response to a manual manipulation from a user.

In most cases, PLMN searching progresses in the background during a time period in which the wireless terminal does not exchange signals with the current network, without interrupting an on-going task. When the wireless terminal supports multiple RATs, the wireless terminal should search PLMNs over each RAT, switching from one RAT to another RAT. If PLMN searching is not performed rapidly and accurately, the wireless terminal may continue receiving the service from the VPLMN despite the existence of a nearby BS of the HPLMN, thereby performing an unnecessary PLMN search procedure.

Accordingly, there exists a need for efficiently performing a background PLMN search procedure in a wireless terminal.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus to search adjacent Public Land Mobile Networks (PLMNs) in the background in a multi-Radio Access Technology (RAT) environment.

Another aspect of the present invention is to provide a method and apparatus to rapidly search for a Home PLMN (HPLMN) in a multi-RAT environment.

Another aspect of the present invention is to provide a method and apparatus to search a passive RAT first during background PLMN searching.

Another aspect of the present invention is to provide a method and apparatus to determine whether to search a passive RAT according to the length of an available scanning time interval.

In accordance with an aspect of the present invention, a method of searching for an operator network in a multi-RAT environment is provided. The method includes calculating a length of a sleep interval to perform background PLMN searching, comparing the length of the sleep interval with a predetermined reference parameter, if the length of the sleep interval is larger than the reference parameter, performing background PLMN searching of a passive RAT during the sleep interval, and if the length of the sleep interval is equal to or smaller than the reference parameter, performing background PLMN searching of an active RAT during the sleep interval.

In accordance with another aspect of the present invention, an apparatus of searching for an operator network in a multi-RAT environment is provided. The apparatus includes a controller to calculate a length of a sleep interval to perform background PLMN searching, and to control background PLMN searching during the sleep interval by comparing the length of the sleep interval with a predetermined reference parameter, and a receiver to perform, if the length of the sleep interval is larger than the reference parameter, background PLMN searching in a passive RAT during the sleep interval, and to perform, if the length of the sleep interval is equal to or smaller than the reference parameter, background PLMN searching in an active RAT during the sleep interval.

In accordance with an aspect of the present invention, a method of searching for an operator network in a multi-RAT environment is provided. The method includes calculating a length of a sleep interval during which background Public Land Mobile Network (PLMN) searching is performed, and determining whether to perform background PLMN searching in a passive RAT or background PLMN searching in an active RAT based on the length of the sleep interval.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
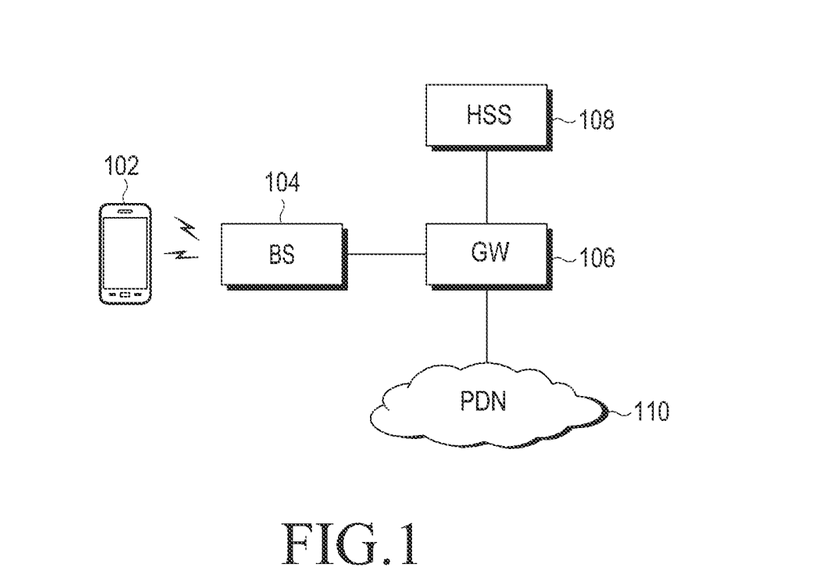
FIG. 1 illustrates a simplified configuration of a mobile communication network according to an exemplary embodiment of the present invention.

FIG. 1 illustrates a simplified configuration of a mobile communication network according to an exemplary embodiment of the present invention.

Referring to FIG. 1, a User Equipment (UE) (or Mobile Station (MS)) 102 may establish a wireless connection with a Base Station (BS) (e.g., a Node B, an enhanced Node B (eNB), or the like) 104 by a specific Radio Access Technology (RAT). The BS 104 connects the UE 102 to at least one of a Packet Data Network (PDN) 110, and other networks via at least one GateWay (GW) 106. A Home Subscriber Server (HSS) 108 is a database that stores key information for authentication and a subscriber profile for each subscriber (e.g., UE) subscribed to a Public Land Mobile Network (PLMN) of a mobile communication operator. If the UE 102 is located in a Home PLMN (HPLMN), the UE may use a mobile communication service based on a subscriber profile stored in the HSS 108. If the UE 102 is located in a Visited PLMN (VPLMN), the HSS 108 may receive subscriber information about the UE 102 from the HSS of the HPLMN of the UE 102 and use the subscriber information to provide a roaming service to the UE 102.

Figure 2:
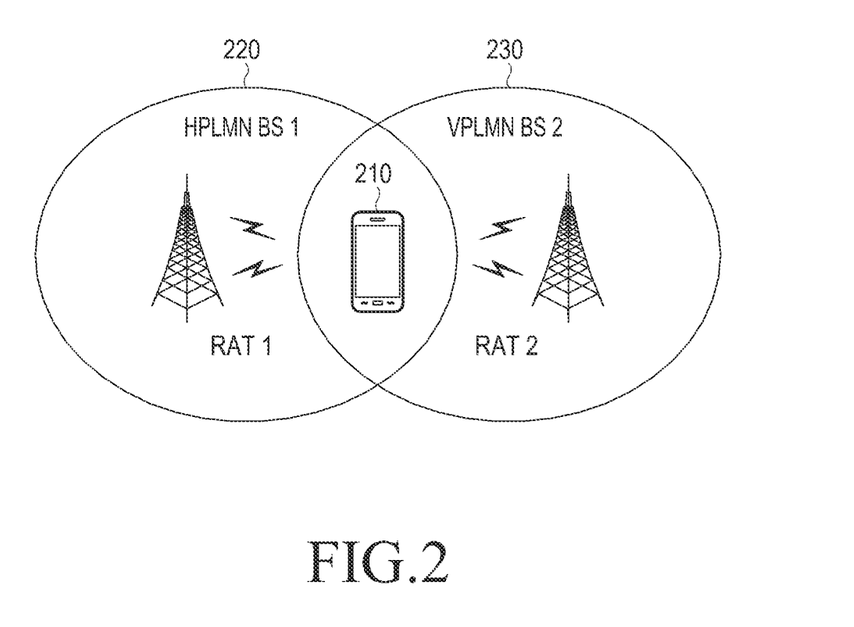
FIG. 2 illustrates an exemplary multi-Radio Access Technology (RAT) environment according to an exemplary embodiment of the present invention.

FIG. 2 illustrates an exemplary multi-Radio Access Technology (RAT) environment according to an exemplary embodiment of the present invention.

Referring to FIG. 2, a UE 210 supporting multiple RATs is located in an area overlapped between a first BS 220 supporting a first RAT and a second BS 230 supporting a second RAT. If the first BS 220 belongs to the HPLMN of the UE 210 and the second BS 230 belongs to a VPLMN of the UE 210, the UE 210 searches PLMNs periodically, while connected to the second BS 230, to determine whether a BS of the HPLMN is near to the UE 210. Upon detection of the existence of the first BS 220 belonging to the HPLMN, the UE 210 may perform handover to the first BS 220.

In view of the nature of hardware structures, most UEs may not connect to two or more frequency bands. Therefore, according to exemplary embodiments of the present invention, to search for the HPLMN, the UE 210 scans cells across a full band in a current active RAT and then scans cells across the full band in a passive RAT(s).

Upon expiration of a scanning timer for PLMN searching, periodic PLMN searching is performed only when a UE is placed in an idle state. If the UE is in a non-idle state (e.g., while the UE is transmitting a Short Message Service (SMS) message or conducting a call), the UE does not start to search PLMNs. Upon expiration of the scanning timer during transmission of an SMS message or data, or during a call in progress, the UE re-starts the scanning timer, without attempting to search PLMNs.

Figure 3:
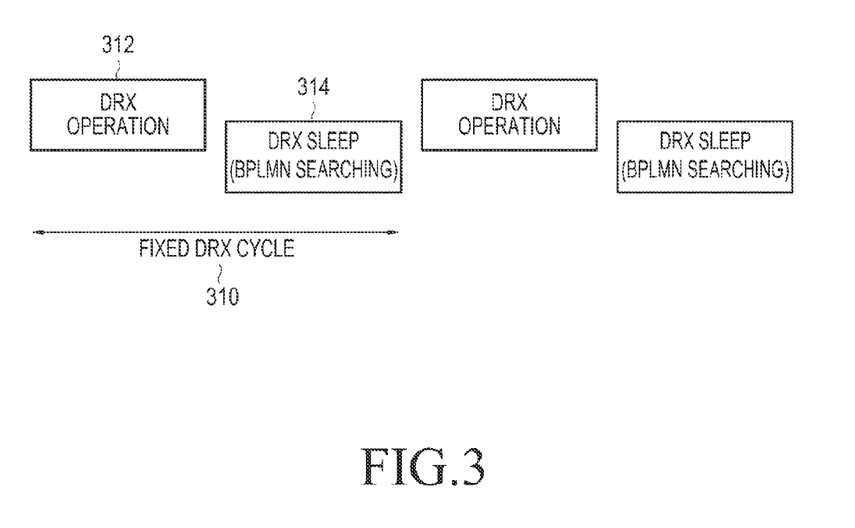
FIG. 3 is a timing diagram illustrating Public Land Mobile Network (PLMN) searching in an idle state according to an exemplary embodiment of the present invention.

FIG. 3 is a timing diagram illustrating PLMN searching in an idle state according to an exemplary embodiment of the present invention.

Referring to FIG. 3, idle-state UEs perform a Discontinuous Reception (DRX) operation in order to reduce the consumption of standby power. The DRX operation is performed periodically according to a fixed DRX cycle 310. The fixed DRX cycle 310 is divided into a DRX active interval 312 and a DRX sleep interval 314. A UE may perform paging and measurement during the DRX active interval 312, and the UE may be placed in a sleep state by turning off related circuits during the DRX sleep interval 314. For example, the UE scans cells across a full band in an active or passive RAT during each DRX sleep interval 314.

The fixed DRX cycle 310 is generally fixed by a network. For example, the fixed DRX cycle may be fixed to 640 ms or 1280 ms. The length of the DRX active interval 312 may be variable. If paging and measurement for each RAT take a lot of time during the DRX active interval 312, the length of the DRX sleep interval 314 is reduced by as such time in the same fixed DRX cycle 310.

To switch a used RAT, the UE may be required to initialize many circuits. For example, to switch from an active RAT to a passive RAT for the purpose of Better PLMN (BPLMN) searching, the UE may power on a modem supporting the passive RAT, initialize a Digital Signaling Processor (DSP), initialize a Radio Frequency (RF) unit, and then enter a stabilization period. When returning to the active RAT after the BPLMN searching, the UE should back up tasks performed in the passive RAT and then power off the RF unit, power off the DSP, and power off the modem associated with the passive RAT. The UE needs a sufficient time to perform the RAT switching.

The length of a time period (avail_time) given for BPLMN searching in an idle state is equal to the length of a sleep interval and may be calculated by subtracting the length of the DRX active interval 312 from the fixed DRX cycle 310. The UE performs background PLMN searching in an active or passive RAT during the sleep interval 314. If the UE fails to finish searching across all frequencies in all supported RATs during one sleep interval, the UE may continue the remaining searching during the next sleep interval.

Because circuits of the active RAT (e.g., an RF unit, a DSP, a modem, and the like of the active RAT) are used during the DRX active interval 312, the UE performs background PLMN searching across a full band, first in the active RAT. After the background PLMN searching of the active RAT is completed, the UE performs background PLMN searching across the full band in a passive RAT. A plurality of DRX cycles may be taken to complete the background PLMN searching.

To perform the background PLMN searching of the passive RAT, the UE may power off circuits related to the active RAT for RAT switching, power on circuits related to the passive RAT, and then initialize the circuits related to the passive RAT during a sleep interval. If the sleep interval is not long enough, the UE may not complete the RAT switching and the background PLMN searching in the passive RAT. In this case, the searching is skipped (or omitted) during the sleep interval.

Figure 4:
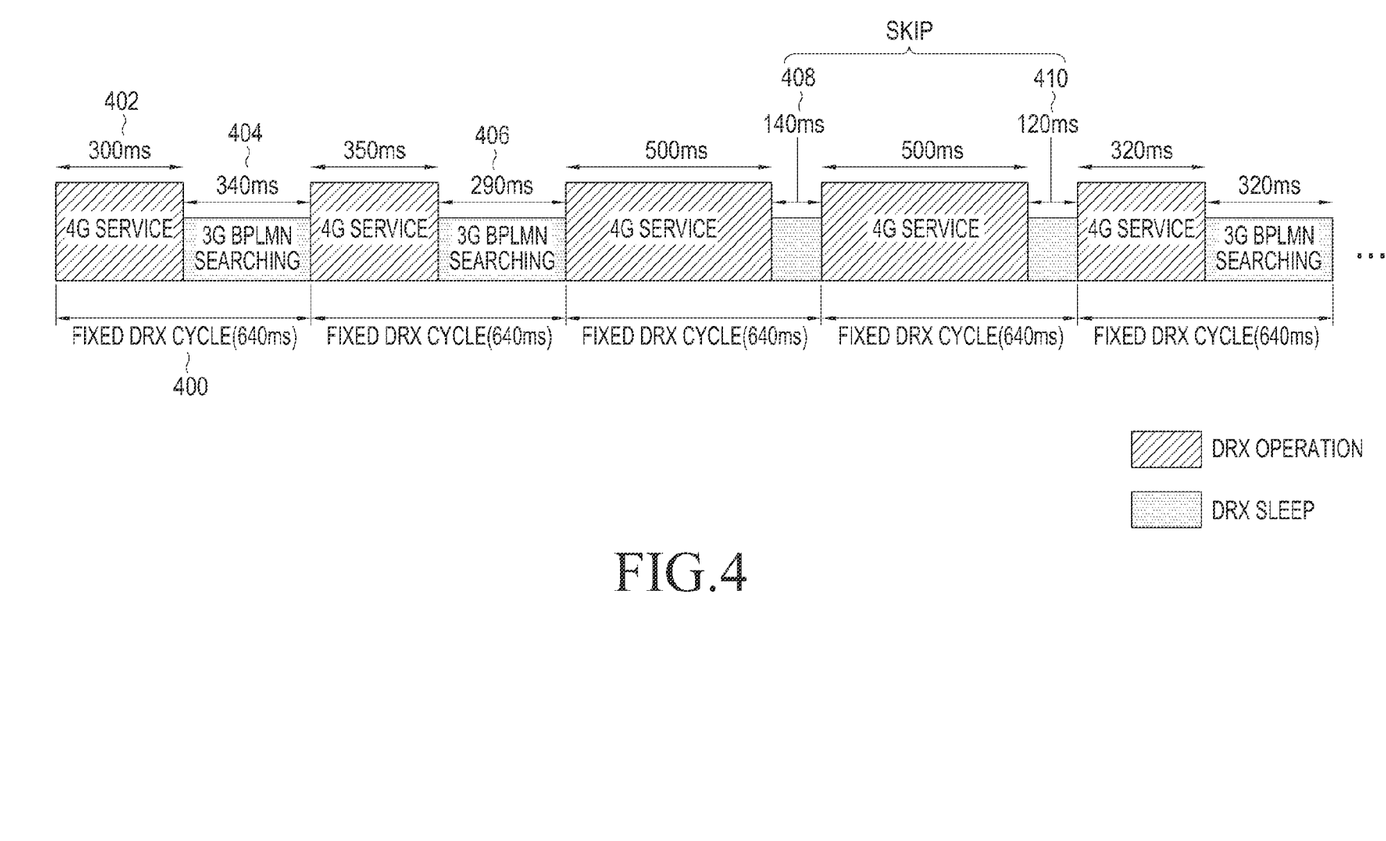
FIG. 4 illustrates a general background PLMN search procedure based on a Discontinuous Reception (DRX) cycle according to an exemplary embodiment of the present invention.

FIG. 4 illustrates a general background PLMN searching procedure based on a DRX cycle according to an exemplary embodiment of the present invention.

Referring to FIG. 4, a UE and a Subscriber Interface Module (SIM) of the UE support 3rd Generation (3G) and 4th Generation (4G) RATs and the UE is receiving a service from a cell belonging to a VPLMN using a current 4G RAT. Therefore, according to the example illustrated in FIG. 4, the 4G RAT corresponds to an active RAT and the 3G RAT corresponds to a passive RAT.

When a fixed DRX cycle 400 starts, the UE performs paging and measurement in the 4G RAT as an active RAT. A time taken for the paging and measurement is a DRX active interval 402. For example, if the fixed DRX cycle 400 is 640 ms and the first DRX active interval 402 is 300 ms, a first sleep interval 404 is 340 ms. The UE performs background PLMN searching in the 3G RAT being the passive RAT during the first sleep interval 404. Specifically, the UE monitors the presence of an adjacent cell of an HPLMN by searching cells across a 3G full frequency band. If the UE fails to detect a cell of the HPLMN, the UE continues receiving a service from the current PLMN. If the cells are not completely searched across the full frequency band in the 3G RAT during the first sleep interval 404, the UE stores a searching result and waits until the next sleep interval 406.

The length of the second sleep interval 406 is 290 ms. After RAT switching, the UE continues searching the remaining cells of the passive RAT during the second sleep interval 404. Likewise, if the UE has not completed searching of cells across the full frequency band in the 3G RAT during the second sleep interval 406, the UE stores a searching result and waits until the next sleep interval 408.

The length of the third sleep interval 408 is 140 ms, shorter than a reference time (e.g., 150 ms) required for RAT switching in the UE. Therefore, the UE does not perform background PLMN searching during the third sleep interval 408. For example, the UE skips the third sleep interval 408. The UE also skips a fourth sleep interval 410 because the length of the fourth sleep interval 410 is 120 ms.

When the length of a sleep interval is shorter than the reference time required for RAT switching as described above, the sleep interval is skipped, leading to much time waste in an overall search procedure. According to exemplary embodiments of the present invention as described below, when a sleep interval is not long enough, background PLMN searching is performed in an active RAT even though background PLMN searching is not completed in a passive RAT.

Figure 5:
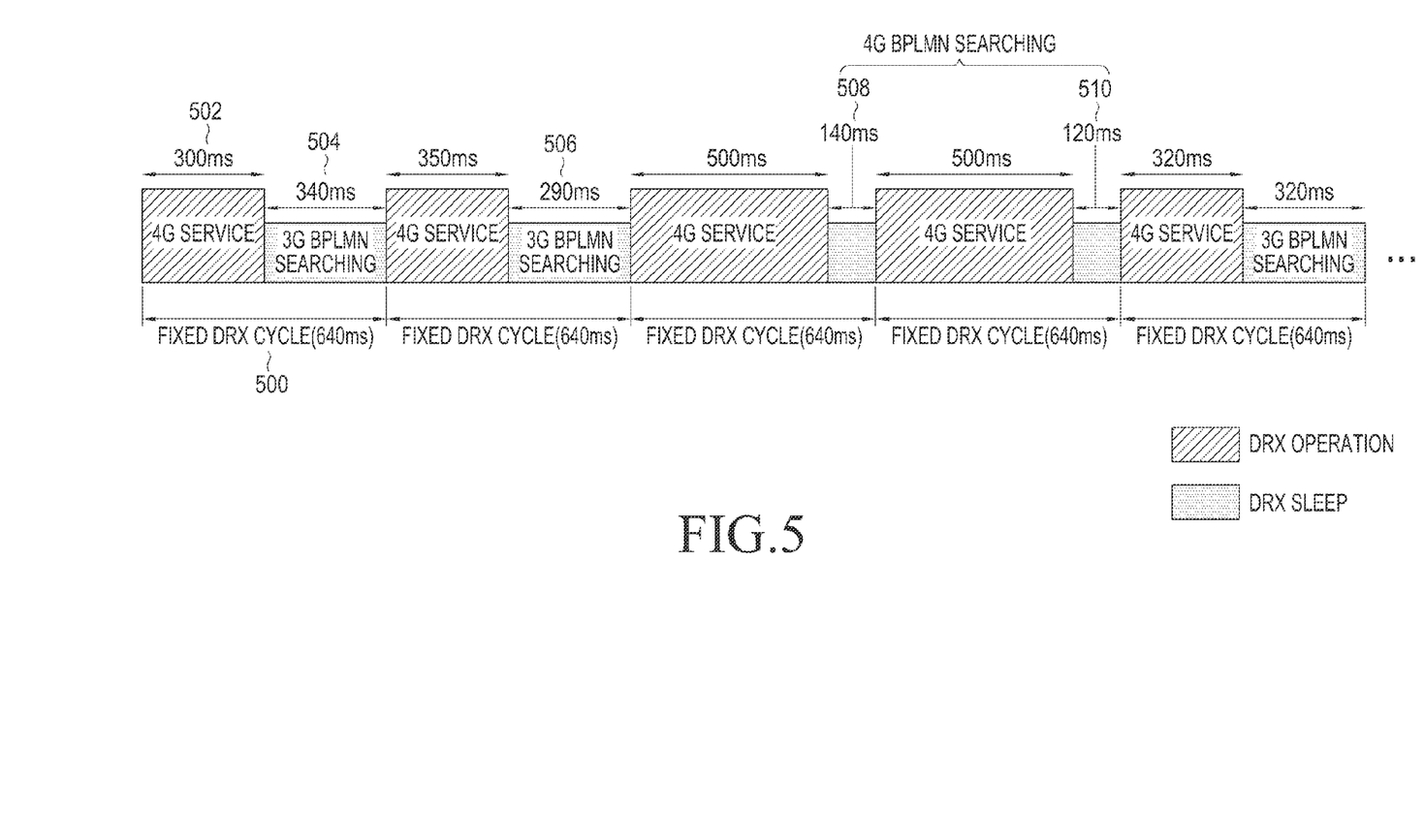
FIG. 5 illustrates a background PLMN search procedure based on a DRX cycle according to an exemplary embodiment of the present invention.

FIG. 5 illustrates a background PLMN search procedure based on a DRX cycle according to an exemplary embodiment of the present invention.

Referring to FIG. 5, a UE and a SIM of the UE support 3G and 4G RATs and the UE is receiving a service from a cell belonging to a VPLMN using the 4G RAT. Therefore, according to the example illustrated in FIG. 5, the 4G RAT corresponds to an active RAT and the 3G RAT corresponds to a passive RAT.

When a fixed DRX cycle 500 starts, the UE performs paging and measurement in the 4G RAT being the active RAT. A time taken for the paging and measurement is a DRX active interval 502. For example, if the fixed DRX cycle 500 is 640 ms and the first DRX active interval 502 is 300 ms, a first sleep interval 504 is 340 ms. The user performs background PLMN searching, first in the 3G RAT being the passive RAT during the first sleep interval 504. Specifically, the UE monitors the presence of a nearby cell of an HPLMN by searching cells across a full frequency band in the 3G RAT. If a cell of the HPLMN has not been detected, the UE continuously receives the service in the 4G RAT as the active RAT. If the UE has not completed searching of the cells across the full frequency band in the 3G RAT during the first sleep interval 504, the UE stores a searching result and waits until the next sleep interval 506.

The second sleep interval 506 is 290 ms. Because the UE has not completed searching of the passive RAT during the previous sleep interval 504, the UE continues searching the remaining cells in the passive RAT after RAT switching, during the second sleep interval 504. If the UE has not completed searching of the cells across the full frequency band in the 3G RAT during the second sleep interval 506, the UE stores a searching result and waits until the next sleep interval 508.

The third sleep interval 508 is 140 ms, shorter than the reference time (e.g., 150 ms) required for RAT switching in the UE. In this case, the UE performs background PLMN searching in the 4G RAT which corresponds to the active RAT. Specifically, the UE monitors the presence of a nearby cell of the HPLMN by searching cells across a full frequency band in the 4G RAT. If a cell of the HPLMN has not been detected, the UE continues receiving the service from the current PLMN. If the UE has not completed searching of the cells across the full frequency band in the 4G RAT during the third sleep interval 508, the UE stores a searching result and waits until the next sleep interval 510.

The fourth sleep interval 510 is 120 ms, shorter than the reference time (e.g., 150 ms) required for RAT switching in the UE. If the UE has not completed searching of the cells across the full frequency band in the 4G RAT during the previous sleep interval 508, the UE performs the remaining background PLMN searching procedure in the 4G RAT which corresponds to the active RAT during the fourth sleep interval 510. Specifically, the UE monitors the presence of a nearby cell of the HPLMN by searching the remaining cells among the cells operating in the 4G RAT across the full frequency band. If a cell of the HPLMN has not been detected, the UE continues receiving the service from the current PLMN. Because the third and fourth sleep intervals 508 and 510 are not wasted in this manner, in contrast to the example illustrated in FIG. 4, the UE may save 260 ms in completing the background PLMN searching.

As described above, the UE starts to search a passive RAT first. If the current sleep interval is not long enough to search the passive RAT, the UE searches an active RAT. After completing the background PLMN searching of the passive RAT, the UE determines whether the background PLMN searching of the active RAT has been completed. If the background PLMN searching of the active RAT has not been completed, the UE performs the remaining background PLMN searching of the active RAT.

As described above, according to exemplary embodiments of the present invention, a UE performs background PLMN searching, first in a passive RAT and if a sleep interval is too short to complete the background PLMN searching of the passive RAT, the UE searches an active RAT. Therefore, the overall time of the background PLMN searching is reduced.

Figure 6:
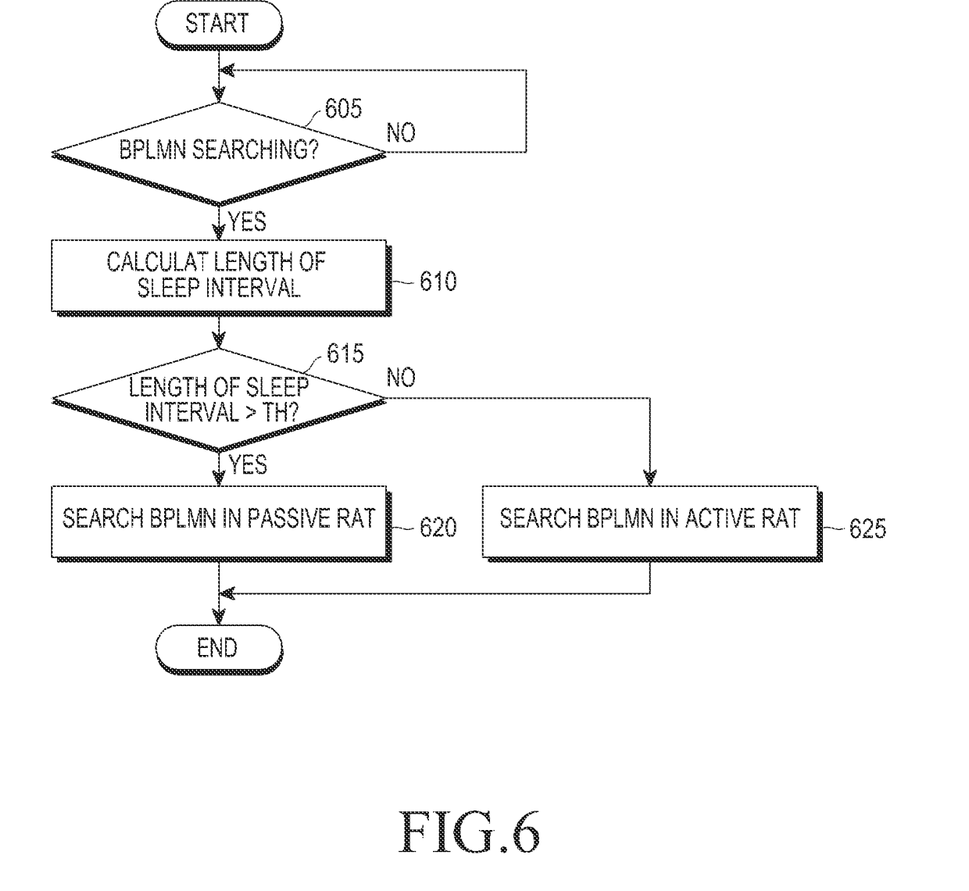
FIG. 6 is a flowchart illustrating a background PLMN search procedure according to an exemplary embodiment of the present invention.

FIG. 6 is a flowchart illustrating a background PLMN search procedure according to an exemplary embodiment of the present invention.

Referring to FIG. 6, in step 605, a UE determines whether to start background PLMN searching. Specifically, upon expiration of a scanning timer while receiving a service from a VPLMN, the UE determines to start background PLMN searching. If the UE is not placed in an idle state at the moment the scanning timer expires, the UE may re-start the scanning timer or wait until a sleep interval of the idle state.

If the UE determines to start PLMN searching in step 605, then the UE proceeds to step 610 in which the UE calculates the length of an upcoming sleep interval. For example, the UE calculates the length of the sleep interval by subtracting the length of an idle-state DRX active interval from a known fixed DRX cycle.

In step 615, the UE compares the length of the sleep interval with a predetermined reference parameter TH. For example, the UE determines whether the length of the sleep interval is greater than the predetermined reference parameter TH.

According to exemplary embodiments of the present invention, the predetermined reference parameter TH may be a minimum time (e.g., 150 to 450 ms) required for backup and initialization/stabilization of circuits (e.g., a modem, a DSP, an RF unit, and the like) in order to switch from one RAT to another RAT. However, the time required for RAT switching may be changed according to a real environment and circuit characteristics in real implementation of the UE.

According to other exemplary embodiments of the present invention supplementing the above exemplary embodiments, the predetermined reference parameter TH may be set according to the result of background PLMN searching during the previous sleep interval. Specifically, if background PLMN searching of a passive RAT is not normally performed during the previous sleep interval, the UE sets a spare time offset (spare_time_offset) equal to the length of the previous sleep interval as the predetermined reference parameter TH. If the current sleep interval is longer than at least the previous sleep interval, the UE may expect that background PLMN searching of the passive RAT is possible during the current sleep interval.

If UE determines that the length of the sleep interval is greater than the predetermined reference parameter TH in step 615, then the UE proceeds to step 620 in which the UE switches to a passive RAT, based on a determination that there is a sufficient time for RAT switching, and then performs background PLMN searching in the passive RAT.

In contrast, if the UE determines that the length of the sleep interval is equal to or less than the predetermined reference parameter TH in step 615, then the UE proceeds to step 625 in which the UE determines that the given time is insufficient for RAT switching and thus performs background PLMN, maintaining the active RAT.

Figure 7:
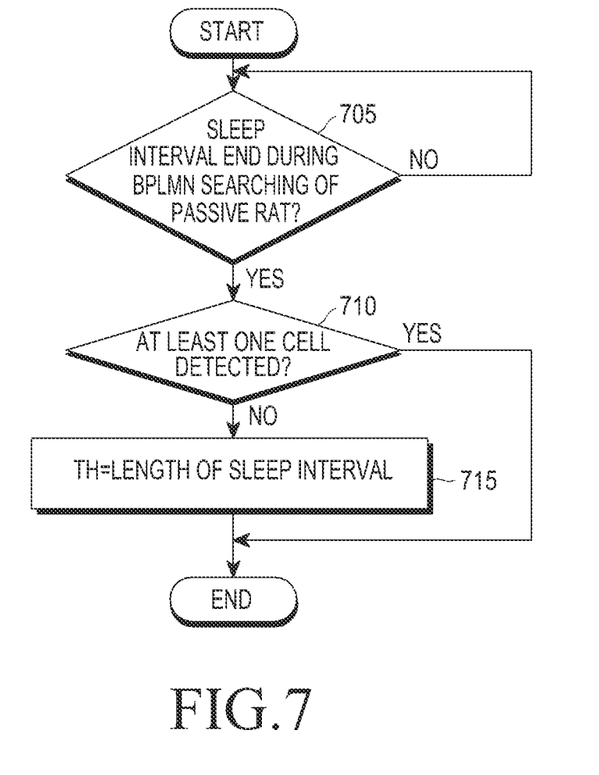
FIG. 7 is a flowchart illustrating a reference time update procedure to search PLMNs in a background according to an exemplary embodiment of the present invention.

FIG. 7 is a flowchart illustrating a reference time update procedure to search PLMNs in a background according to an exemplary embodiment of the present invention.

Referring to FIG. 7, a reference time updated in the procedure described below may be used as the predetermined reference parameter to be compared with the length of a sleep interval in step 615 of FIG. 6.

In step 705, the UE senses (e.g., detects or determines) termination of a current sleep interval, while performing background PLMN searching in a passive RAT during the current sleep interval according to a predetermined condition (e.g., a scanning timer, and the like).

If the UE senses the termination of the current sleep interval in step 705, then the UE proceeds to step 710 in which the UE determines whether at least one cell has been detected during the current sleep interval.

If the UE determines that at least one cell has been detected in the passive RAT in step 710, then the UE ends the procedure, determining that it is not necessary to update the reference time.

In contrast, if the UE determines that no cell has been detected in the passive RAT during the current sleep interval in step 710, then the UE proceeds to step 715 in which the UE updates the reference time TH used to determine background PLMN searching to the length of the current sleep interval. Thus, only when the next sleep interval is longer than the current sleep interval, the UE performs background PLMN searching in the passive RAT during the next sleep interval.

Figure 8:
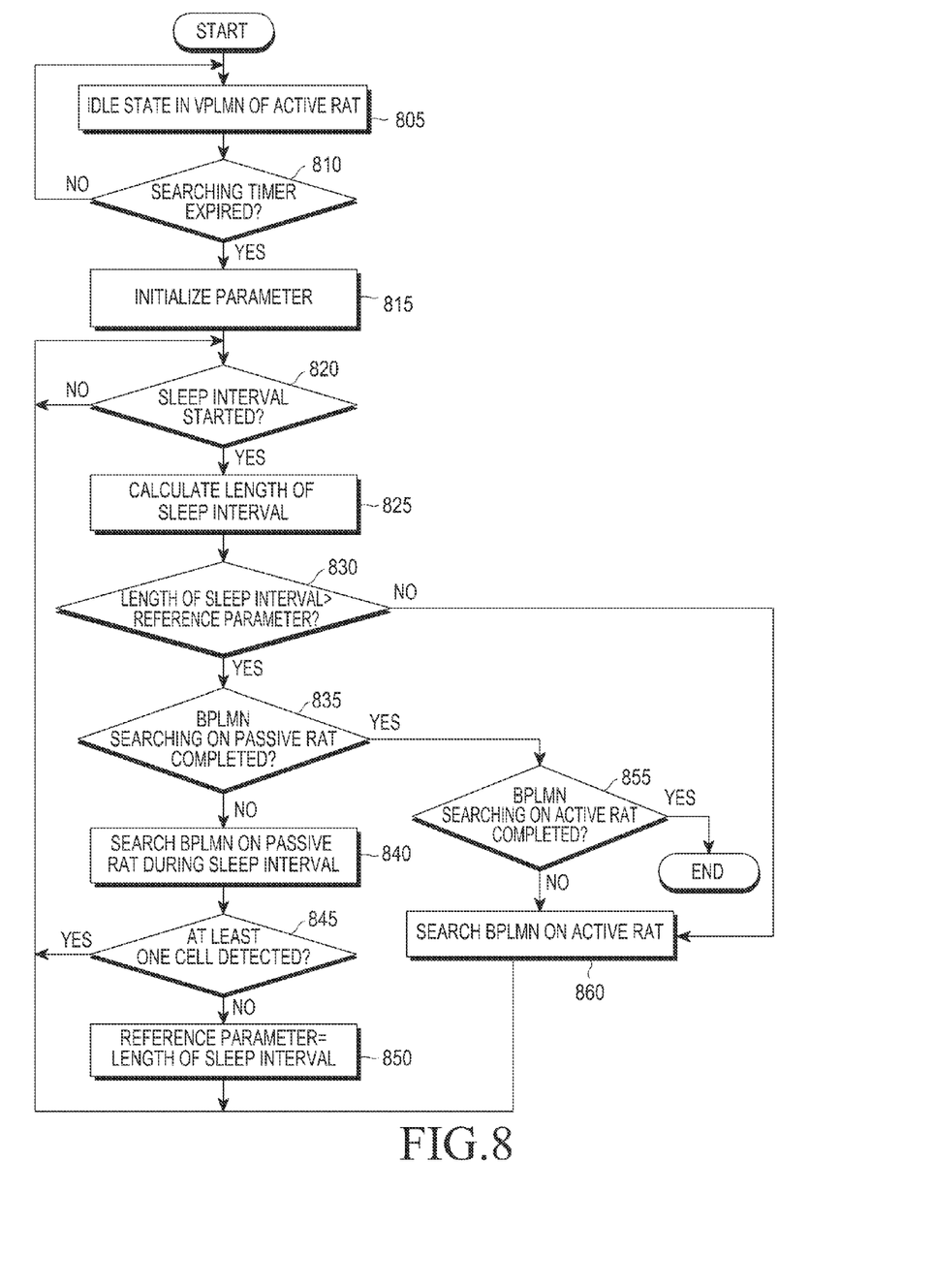
FIG. 8 is a flowchart illustrating a background PLMN search procedure according to an exemplary embodiment of the present invention.

FIG. 8 is a flowchart illustrating a background PLMN search procedure according to an exemplary embodiment of the present invention.

Referring to FIG. 8, in step 805, the UE is placed in an idle state in a cell of a VPLMN operating in an active RAT.

In step 810, the UE waits until a scanning timer expires to perform background PLMN searching. Upon expiration of the scanning timer, the UE proceeds to step 815 in which the UE initializes a reference parameter for background PLMN searching. For example, the reference parameter may be set initially to a minimum time required for RAT switching (e.g., 150 to 450 ms).

In step 820, while waiting in the idle state, the UE determines whether a sleep interval has started. If the UE determines that the sleep interval has not started in step 820, the UE returns to step 820 and continues to poll until the sleep interval starts. In contrast, if the UE determines that the sleep interval has started in step 820, then the UE proceeds to step 825 in which the UE calculates the length of the sleep interval. For example, the UE calculates the length of the sleep interval when the sleep interval starts. As described above, the length of the sleep interval may be calculated by subtracting the length of a DRX active interval from a fixed DRX cycle.

In step 830, the UE compares the calculated length of the sleep interval with the reference parameter. For example, the UE determines whether the length of the sleep interval is greater than the reference parameter. If the UE determines that the calculated length of the sleep interval is greater than the reference parameter in step 830, then the UE proceeds to step 835. In contrast, if the UE determines that the length of the sleep interval is less than or equal to the UE proceeds to step 860.

In step 835, UE determines whether background PLMN searching of a passive RAT has been completed previously. The determination may be made according to the result of background PLMN searching of the passive RAT stored during a previous sleep interval. For example, the UE may determine whether all cells have been searched across a full frequency band in the passive RAT.

If the UE determines that all cells have been searched across a full frequency band in the passive RAT in step 835, then the UE proceeds to step 855 in which the UE determines whether background PLMN searching of an active RAT has been completed previously. If the UE determines that the background PLMN searching of the active RAT has been completed in step 855, then the UE ends the procedure. In contrast, if the UE determines that the background PLMN searching of the active RAT has not been completed in step 855, then the UE proceeds to step 860 in which the UE performs background PLMN searching in the active RAT. If some cells have already been searched in the active RAT during at least one previous sleep interval, the UE may search the other cells in the active RAT.

If the UE determines that the background PLMN searching of the passive RAT has not been completed in step 835, then the UE proceeds to step 840 in which the UE performs background PLMN searching in the passive RAT. If some cells have already been searched in the passive RAT during at least one previous sleep interval, the UE may search the other cells in the passive RAT.

In step 845, the UE determines whether at least one cell has been detected in the passive RAT searching. If the UE determines that at least one cell has been detected in the passive RAT searching in step 845, then the UE returns to step 820 because updating the reference parameter is not necessary. In contrast, if the UE determines that no cell has been detected in the passive RAT searching in step 845, then the UE proceeds to step 850 in which the UE updates the reference parameter to the length of the current sleep interval (e.g., calculated in step 825) and then returns to step 820.

Figure 9:
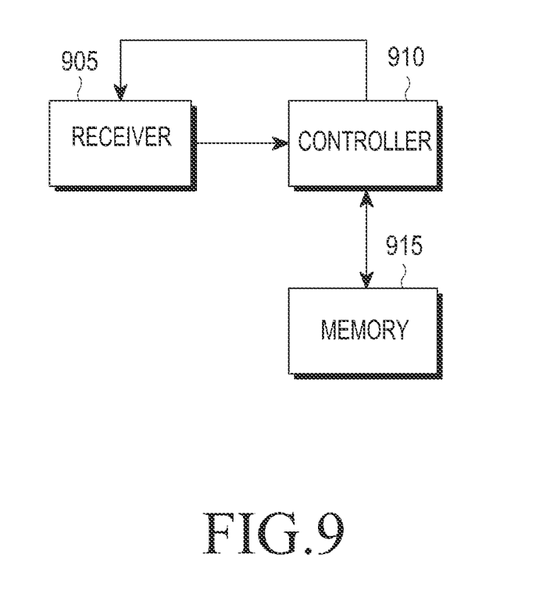
FIG. 9 is a block diagram of a User Equipment (UE) according to an exemplary embodiment of the present invention.

FIG. 9 is a block diagram of a UE according to an exemplary embodiment of the present invention.

Referring to FIG. 9, a receiver 905 includes components such as an RF unit, a modem to receive a signal from at least one of a serving BS and adjacent BSs, and a DSP. The receiver 905 scans signals in a specific frequency of a specific RAT under the control of a controller 910 and provides a signal representing a scanning result to the controller 910. The controller 910 determines whether to perform background PLMN searching according to a current state of the UE and a scanning timer. If determining to perform background PLMN searching, the controller 910 transmits a control command indicating an RAT and frequency band to be searched to the receiver 905 and identifies PLMNs of detected cells based on the signal received from the receiver 905. A memory 915 stores parameters needed for operations of the controller 910 and searching results.

As is apparent from the above description, even though a sleep interval is not long enough, a UE searches an active RAT without skipping the sleep interval, thereby reducing an overall time of background PLMN searching. For example, if a total of 5 minutes are taken for background PLMN searching with 2 minutes for searching of an active RAT and 3 minutes for searching of a passive RAT in technology according to the related art. However, according to exemplary embodiments of the present invention, background PLMN searching is completed within 3 minutes at maximum because the active RAT is searched between passive RAT search operations. As a result, the searching time is decreased by 2 minutes.

It will be appreciated that exemplary embodiments of the present invention according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing apparatus or a method as claimed in any one of the claims of this specification and a machine-readable storage storing such a program.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of searching for an operator network in a multi-Radio Access Technology (RAT) environment, the method comprising:
   calculating a length of a sleep interval to perform background Public Land Mobile Network (PLMN) searching;
   comparing the length of the sleep interval with a predetermined reference parameter;
   if the length of the sleep interval is larger than the reference parameter, performing background PLMN searching in a passive RAT during the sleep interval; and
   if the length of the sleep interval is equal to or smaller than the reference parameter, performing background PLMN searching in an active RAT during the sleep interval.

2. The method of claim 1, wherein the reference parameter is determined taking into account a minimum time required for RAT switching in a User Equipment (UE).

3. The method of claim 1, further comprising:
- determining whether at least one cell has been detected based on the background PLMN searching of the passive RAT; and
- if no cell has been detected in the background PLMN searching of the passive RAT, updating the reference parameter to the length of the sleep interval and proceeding to a next sleep interval.

4. The method of claim 1, further comprising:
- if the length of the sleep interval is larger than the reference parameter, determining whether the background PLMN searching of the passive RAT has been completed during a previous sleep interval;
- if the background PLMN searching of the passive RAT has been completed during the previous sleep interval, performing background PLMN searching in the active RAT during the sleep interval; and
- if the background PLMN searching of the passive RAT has not been completed during the previous sleep interval, determining to perform background PLMN searching in the passive RAT during the sleep interval.

5. The method of claim 1, wherein the calculation of the length of the sleep interval comprises calculating the length of the sleep interval by subtracting a length of an idle-state active interval from a fixed cycle.

6. An apparatus of searching for an operator network in a multi-Radio Access Technology (RAT) environment, the apparatus comprising:
- a controller to calculate a length of a sleep interval to perform background Public Land Mobile Network (PLMN) searching, and to control background PLMN searching during the sleep interval by comparing the length of the sleep interval with a predetermined reference parameter; and
- a receiver to perform, if the length of the sleep interval is larger than the reference parameter, background PLMN searching in a passive RAT during the sleep interval, and to perform, if the length of the sleep interval is equal to or smaller than the reference parameter, background PLMN searching in an active RAT during the sleep interval.

7. The apparatus of claim 6, wherein the reference parameter is determined taking into account a minimum time required for RAT switching in a User Equipment (UE).

8. The apparatus of claim 6, wherein if no cell has been detected in the background PLMN searching of the passive RAT, the controller updates the reference parameter to the length of the sleep interval and proceeds to a next sleep interval.

9. The apparatus of claim 6, wherein the controller determines, if the length of the sleep interval is larger than the reference parameter, whether the background PLMN searching of the passive RAT has been completed during a previous sleep interval,
- wherein the controller performs, if the background PLMN searching of the passive RAT has been completed during the previous sleep interval, background PLMN searching in the active RAT during the sleep interval, and
- wherein the controller determines, if the background PLMN searching of the passive RAT has not been completed during the previous sleep interval, to perform background PLMN searching in the passive RAT during the sleep interval.

10. The apparatus of claim 6, wherein the controller calculates the length of the sleep interval by subtracting a length of an idle-state active interval from a fixed cycle.

11. A non-transitory computer-readable storage medium storing instructions, that when executed, cause at least one processor to perform the method of claim 1.

12. A method of searching for an operator network in a multi-Radio Access Technology (RAT) environment, the method comprising:
- calculating a length of a sleep interval during which background Public Land Mobile Network (PLMN) searching is performed; and
- determining whether to perform background PLMN searching in a passive RAT or background PLMN searching in an active RAT based on the length of the sleep interval.

13. A non-transitory computer-readable storage medium storing instructions, that when executed, cause at least one processor to perform the method of claim 12.

* * * * *